United States Patent [19]

Monserie

[11] 3,962,975

[45] June 15, 1976

[54] FLUIDIC VALVE

[76] Inventor: Philippe Jean Monserie, Le Monceau, Estouy-par-Pithiviers (Loiret), France

[22] Filed: Dec. 23, 1974

[21] Appl. No.: 535,210

[30] Foreign Application Priority Data
Dec. 26, 1973  France .............................. 73.46691

[52] U.S. Cl. ............................. 104/23 FS; 104/134; 214/1 BE
[51] Int. Cl.² ......................................... B61B 13/08
[58] Field of Search ........................ 104/23 FS, 134; 214/1 BE; 251/63

[56] References Cited
UNITED STATES PATENTS
3,081,886   3/1963   Flexman .......................... 104/23 FS
3,685,788   8/1972   Bloomfield .................. 104/23 FS X

*Primary Examiner*—Allen N. Knowles
*Assistant Examiner*—D. W. Keen
*Attorney, Agent, or Firm*—Sherman Levy

[57] ABSTRACT

A fluidic valve allowing to propel and sustain a moving device on an air-cushion, by means of a fluid under pressure issued from caissons serving as guiderails, through the opening, when the moving device travels, of valves forming air-locks and drawers, said valves comprising a sleeve perforated so as to provide the valves with fluid towards the outlet, in a laminar discharge, with venturi and vortex effects intended to suck up the movable obturator towards the outlet, a duct or a fluid container. An over-pressure caused by a movable object passing at the outlet of the sleeve drives the movable obturator downwards, disclosing the lights of the sleeve. The fluid leaves the container. If the object is removed, the fluid flows more quickly and, thanks to venturi and vortex effects, a depression occurs, which drives the movable obturator upwards, thus stopping the outflow of the fluid. The movable obturator is maintained in a high position by means of a guiding ensured by the recuparation of a fluid issued from the container depending on the clearance existing between the movable obturator and the sleeve, the flow of which is regulated by the gauged duct securing the Δp required for maintaining the piston in a high position.

10 Claims, 2 Drawing Figures

U.S. Patent June 15, 1976 3,962,975
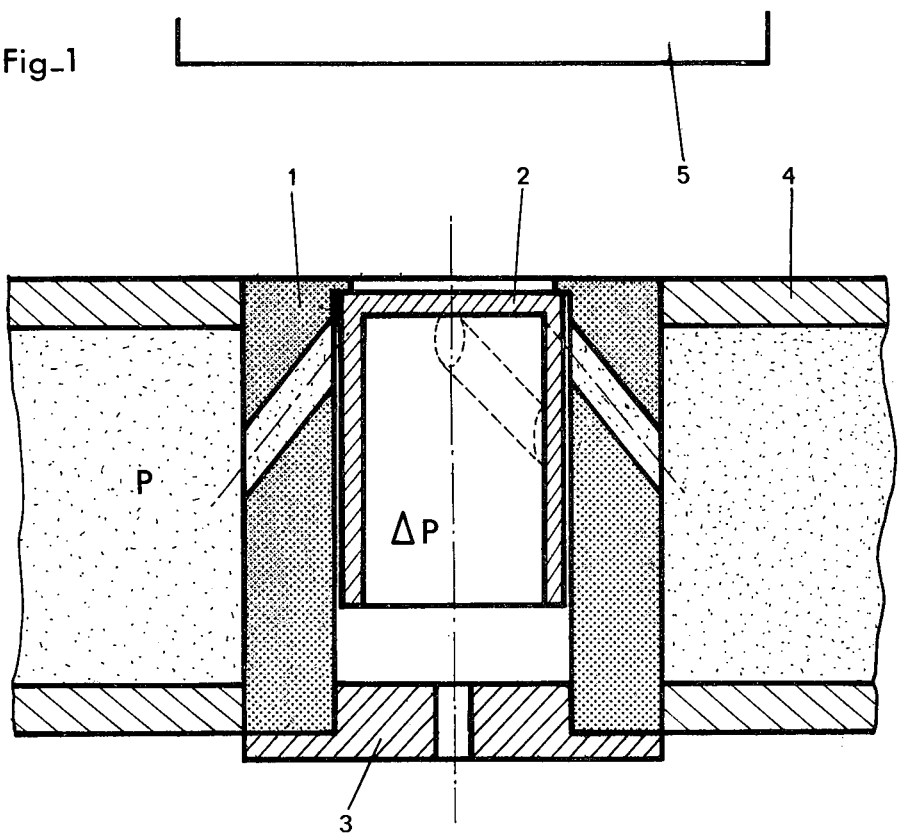
Fig_1
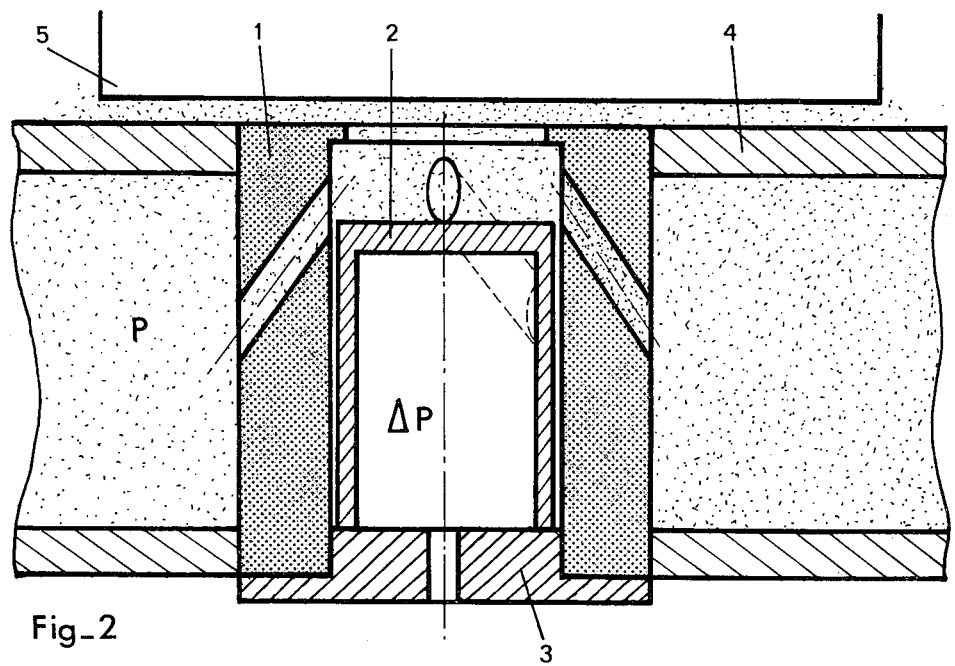
Fig_2

FLUIDIC VALVE

The present invention relates to air-cushion conveyors the air-cushion of which causes, under any load, opening of valves thus ensuring renewal of the air-cushion.

In known devices of this type, it is required to act mechanically for initiating the outflow and, in case shutters are used for closing the outlet holes, a too great fluid outflow quickly closes the shutters due to the dynamic pressure of the fluid.

The device according to the invention allows to avoid these drawbacks. It is then possible to have a great volume of fluid discharged without entailing closure of the valve, and without any mechanical contact.

To this end, the invention relates to a fluidic valve allowing to propel and sustain a moving device on an air-cushion, by means of a fluid under pressure issued from caissons serving as guide-rails, through the opening, when the moving device travels, of valves forming air-locks and drawers, a fluidic valve obturator inside a sleeve comprising an opening towards the movable device to be sustained, apertures for leaving passage to the fluid under pressure contained in the caissons, and of a guiding device for the obturator.

Thus, the valve comprises a sleeve with apertures oriented in two different planes, that is to say, oriented on the one hand towards the outlet and, on the other, in such a way to cause a vortex. In that way, the jets of air issued from each aperture do not run into each others, bur are harmonically mixed up in a whirlwind with a laminar discharge. When working, when any object reaches the alignment of the valve, it initiates a pressure on to the movable obturator, which drives the latter downwards. The fluidic effects are then perturbed and keep the pressure which maintains the movable obturator downwards, thus ensuring the outflow of the fluid.

When the object is removed, the depression initiated by the fluidic effects created sucks up the movable obturator upwards, thus blinding the lights. So as to be maintained upwards, the movable obturator must be pushed upwards by a force. Said force will be initiated by a guide. However, should it be necessary, the movable obturator will not be guided because of a matter of sensibility. According to the mode of embodiment of the invention, guiding is performed by means of a $\Delta p$ issued from the fluid collecting coming from the container through the clearance existing between the movable obturator and the sleeve, and regulated by the section of the duct which serves as a waste-pipe. According to other modes of embodiments of the invention, this guiding means can be performed by a spring, or through gravity, or again through an external guiding connected to the waste-pipe. The delivery of the valve can be modified by changing the height of the piston by means of a screw and of any other mechanical systems.

FIGS. 1 and 2, illustrate by way of example, a mode of embodiment according to the present invention. Such as shown, the device comprises a sleeve 1, perforated, provided with an abutment of the movable obturator in its upper position, said abutment serving, here, as a tight air-lock, a movable obturator 2, cylinder-shaped channelled in order to lower its weight and, thereby, to lower the force required for maintaining it in its upper position, a stopper 3 provided with an air-hole, gauged depending on the clearance existing between the movable obturator and the sleeve, so as to performe a $\Delta p$ necessary to maintain the movable obturator in its upper position, said stopper itself serving as an abutment when the obturator is in its low position.

According to a variation in the construction of the valve, the movable obturator and the sleeve may have differential sections with guiding through an air-hole located at the bottom of the sleeve, or through guiding by means of a spring 7, or again through gravity.

According to another mode of embodiment, the fluid outflow is distributed in accordance with the direction of displacement of the object 5, which allows to simultaneously ensure the sustentation and propulsion of the object.

Of course, the invention is not limited to the examples of embodiment described and represented hereabove, from which other modes and methods of embodiment can be made without, thereby, departing from the scope of the invention.

What we claim is:

1. A fluidic valve for permitting the propelling and sustaining of a moving body on an air cushion by means of a fluid under pressure, said valve having orifices receiving fluid under pressure, said valve including a hollow piston, a jacket having said piston movable therein, and said jacket including a base, a stopper closing the base of said jacket, there being a vent in said stopper, said jacket including lateral openings that communicate with the fluid under pressure, and wherein said last named openings can be closed by said movable piston.

2. The structure as defined in claim 1, wherein said openings are inclined.

3. The structure as defined in claim 2, wherein the movable piston can occupy a low position or an open position, and a high position or a closed position in which the lateral openings communicate with the fluid under pressure.

4. The structure as defined in claim 3, wherein the vent in the stopper is calibrated in accordance with the play between the piston and the jacket in order to obtain the difference in pressure $\Delta P$ to maintain the piston in the high position.

5. The structure as defined in claim 4, wherein before the movable body reaches a position opposite the valve, the piston is in the high position.

6. The structure as defined in claim 5, wherein when the movable body reaches the piston, the air-cushion disturbed by the adjacent valve pushes the piston in slightly to free the lateral openings to permit the driving fluid to pass.

7. The structure as defined in claim 6 wherein initially the gas stream passing through the openings is weak as it is disturbed by the presence of the movable body and wherein there is no suction effect so that the impulse given to the piston is sufficient to push the piston in.

8. The structure as defined in claim 7, wherein the piston is in the low position or open position during the passage of the movable body above the valve.

9. The structure as defined in claim 8, wherein when the piston leaves the valve, the gas stream emitted by the lateral openings assume their maximum value and create a suction effect on the piston and pull it to its high position.

10. The structure as defined in claim 9, wherein a part of the air passes behind the piston between the jacket and the piston and helps maintain the piston in its high position.

* * * * *